(12) United States Patent
Rezaiifar et al.

(10) Patent No.: US 8,787,578 B2
(45) Date of Patent: Jul. 22, 2014

(54) METHOD AND APPARATUS FOR ENCRYPTING TRANSMISSIONS IN A COMMUNICATION SYSTEM

(75) Inventors: Ramin Rezaiifar, San Diego, CA (US); Roy F. Quick, Jr., San Diego, CA (US); Paul Williamson, San Diego, CA (US); Jun Wang, San Diego, CA (US); Edward G. Tiedemann, Jr., San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1908 days.

(21) Appl. No.: 11/269,449

(22) Filed: Nov. 7, 2005

(65) Prior Publication Data

US 2006/0056637 A1 Mar. 16, 2006

Related U.S. Application Data

(62) Division of application No. 09/676,036, filed on Sep. 28, 2000, now Pat. No. 6,980,658.

(60) Provisional application No. 60/156,905, filed on Sep. 30, 1999.

(51) Int. Cl.
*H04K 1/00* (2006.01)

(52) U.S. Cl.
USPC .......................... 380/274; 380/280; 380/286

(58) Field of Classification Search
USPC .............. 380/21, 23, 44, 205, 209, 274, 262, 380/280, 286
See application file for complete search history.

(56) References Cited

U.S. PATENT DOCUMENTS

| | | | |
|---|---|---|---|
| 4,754,482 A | 6/1988 | Weiss | |
| 4,910,777 A | 3/1990 | Larson et al. | |
| 5,081,679 A | 1/1992 | Dent et al. | |
| 5,142,578 A * | 8/1992 | Matyas et al. | 380/280 |
| 5,386,469 A | 1/1995 | Yearsley et al. | |
| 5,448,237 A * | 9/1995 | Borgen et al. | 341/131 |
| 5,467,398 A * | 11/1995 | Pierce et al. | 380/44 |

(Continued)

FOREIGN PATENT DOCUMENTS

| | | |
|---|---|---|
| GB | 2313989 A | 12/1997 |
| JP | 07325785 | 12/1995 |

(Continued)

OTHER PUBLICATIONS

Chuang, S-C, "Securing ATM Metworks", 3rd ACM Conference on Computer and Communications Security. New Delhi, Mar. 14-16, 1996, New York, ACM, US, vol. CONF.3. pp. 19-30, XP000620974, ISBN: 0-89791-829-0.

(Continued)

*Primary Examiner* — Farid Homayounmehr
*Assistant Examiner* — Suman Debnath
(74) *Attorney, Agent, or Firm* — Won Tae Kim

(57) ABSTRACT

Method and apparatus for encrypting transmission traffic at separate protocol layers L1, L2, and L3 so that separate encryption elements can be assigned to separate types of transmission traffic, which allows the implementation of different levels of encryption according to service requirements. Encryption elements use variable value inputs, called crypto-syncs, along with semi-permanent encryption keys to protect from replay attacks from rogue mobile stations. Since crypto-sync values vary, a method for synchronizing crypto-syncs at the mobile station and base station is also presented.

22 Claims, 9 Drawing Sheets

(56) References Cited

U.S. PATENT DOCUMENTS

| | | | |
|---|---|---|---|
| 5,528,693 A * | 6/1996 | Leopold | 380/274 |
| 5,594,869 A | 1/1997 | Hawe et al. | |
| 5,796,839 A | 8/1998 | Ishiguro | |
| 5,832,210 A | 11/1998 | Akiyama et al. | |
| 5,958,051 A * | 9/1999 | Renaud et al. | 726/22 |
| 6,055,316 A * | 4/2000 | Perlman et al. | 380/262 |
| 6,081,600 A | 6/2000 | Blanchard et al. | |
| 6,151,676 A | 11/2000 | Cuccia et al. | |
| 6,459,682 B1 * | 10/2002 | Ellesson et al. | 370/235 |
| 6,539,094 B1 | 3/2003 | Osakabe et al. | |
| 6,615,353 B1 | 9/2003 | Hashiguchi | |
| 6,782,473 B1 * | 8/2004 | Park | 713/160 |
| 6,980,658 B1 | 12/2005 | Rezaiifar et al. | |

FOREIGN PATENT DOCUMENTS

| | | |
|---|---|---|
| JP | H08503113 A | 4/1996 |
| JP | 8149122 A | 6/1996 |
| JP | 10003256 A | 1/1998 |
| JP | 10233770 A | 9/1998 |
| JP | 10303945 A | 11/1998 |
| JP | 11041230 A | 2/1999 |
| WO | WO-9506374 A1 | 3/1995 |
| WO | 9817028 A1 | 4/1998 |
| WO | 9826534 A1 | 6/1998 |
| WO | 9907104 A1 | 2/1999 |
| WO | 0027090 A2 | 5/2000 |
| WO | 00054456 | 9/2000 |

OTHER PUBLICATIONS

Mehrotra, A. et al., "Mobility and Security Management in the GSM System and Some Proposed Future Improvements," New York, vol. 86, No. 7, Jul. 1998 1480-1497, XP000854168.

International Search Report—PCT/US2000/026880, International Search Authority—European Patent Office—Oct. 15, 2001.

International Preliminary examination Report—PCT/US2000/026880, International Search Authority—IPEA/US—2002/10/15.

Alfred J. Menezes, Paul C. van Oorschot and Scott A. Vanstone. Handbook of Applied Cryptography, CRC Press. (Oct. 1996): p. 364 (in particular, refer to section 9.6.3). http://www.carr.math.uwaterloo.ca/hac/about/chap9pdf.

Davies, D.W., et al., "Network Security," Japan, Nikkei McGraw-Hill Inc., Dec. 5, 1985, 1st edition, 1st printing, pp. 126-132.

European Search Report—EP07119005—Search Authority—Munich—Dec. 18, 2007.

Lynch, C.D., et al., "Internet System Handbook," Japan, Impress R & D, 1st ed., Aug. 11, 1996, pp. 152-156.

* cited by examiner

NOTE: L2 FIELDS REPRESENTS ALL THE FIELDS THAT ARE ADDED BY CDMA2000 LAC AND ARE NOT EXPLICITLY SHOWN IN THIS FIGURE AS SEPARATE FIELD (E.G., ARQ, AUTH., ETC.)

METHOD AND APPARATUS FOR ENCRYPTING TRANSMISSIONS IN A COMMUNICATION SYSTEM

CLAIM OF PRIORITY UNDER 35 U.S.C. §119

The present Application for Patent claims priority to Provisional Application No. 60/156,905, entitled, "CDMA2000 ENCRYPTION ARCHITECTURE AND RLP OPERATION ON COMMON CHANNELS" filed Sep. 30, 1999, and assigned to the assignee hereof and hereby expressly incorporated by reference herein.

CLAIM OF PRIORITY UNDER 35 U.S.C. §120

The present application for patent is a Divisional of patent application Ser. No. 09/676,036 entitled "METHOD AND APPARATUS FOR ENCRYPTING TRANSMISSIONS IN A COMMUNICATION SYSTEM" filed Sep. 28, 2000 now U.S. Pat. No. 6,980,658, and assigned to the assignee hereof and hereby expressly incorporated by reference herein.

BACKGROUND

I. Field of the Invention

The present invention pertains generally to the field of wireless communications, and more specifically to methods and apparatus for providing secure transmissions in a wireless communication system.

II. Background

A modern day communication system is required to support a variety of applications. One such communication system is a code division multiple access (CDMA) system that conforms to the "TIA/EIA/IS-95 Mobile Station-Base Station Compatibility Standard for Dual-Mode Wideband Spread Spectrum Cellular System," hereinafter referred to as the IS-95 standard, or a CDMA system that conforms to the "TIA/EIA/IS-2000 Standard for cdma2000 Spread Spectrum Systems," hereinafter referred to as the IS-2000 standard. Another CDMA standard is the W-CDMA standard, as embodied in $3^{rd}$ Generation Partnership Project "3GPP", Document Nos. 3G TS 25.211, 3G TS 25.212, 3G TS 25.213, and 3G TS 25.214. A CDMA system allows for voice and data communications between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", and U.S. Pat. No. 5,103,459, entitled "SYSTEM AND METHOD FOR GENERATING WAVEFORMS IN A CDMA CELLULAR TELEPHONE SYSTEM", both assigned to the assignee of the present invention and incorporated by reference herein. Other examples of communication systems are time division multiple access (TDMA) systems and frequency division multiple access (FDMA) systems.

In this specification, base station refers to the hardware with which the remote stations communicate. Cell refers to the hardware or the geographic coverage area, depending on the context in which the term is used. A sector is a partition of a cell. Because a sector of a CDMA system has the attributes of a cell, the teachings described in terms of cells are readily extended to sectors.

In a CDMA system, communications between users are conducted through one or more base stations. A first user on one remote station communicates to a second user on a second remote station by transmitting data on the reverse link to a base station. The base station receives the data and can route the data to another base station. The data is transmitted on the forward link of the same base station, or a second base station, to the second remote station. The forward link refers to transmission from the base station to a remote station and the reverse link refers to transmission from the remote station to a base station. In IS-95 and IS-2000 FDD mode systems, the forward link and the reverse link are allocated separate frequencies.

In the field of wireless communications, security of over-the-air transmissions has become an increasingly important aspect in communication systems. Security is often maintained through encryption protocols that prevent disclosure of private communications between parties and/or prevent rogue mobile stations from accessing services for which payment has not been rendered to the communication service provider. Encryption is a process whereby data is manipulated by a random process such that the data is made unintelligible by all but the intended recipient. Decryption is simply the process of recovering the original data. One type of encryption algorithm commonly used in the industry is the Enhanced Cellular Message Encryption Algorithm (EC-MEA), which is a block cipher. Due to the sophistication of modem day code-breakers and "hackers," a need presently exists to create stronger, more secure encryption processes to protect users of wireless communication services and service providers.

SUMMARY

A novel and improved method and apparatus for encrypting transmissions is presented, wherein the method for encrypting transmission traffic, comprises: generating a variable value; and inputting the variable value, an encryption key, and the transmission traffic into an encryption algorithm.

In one aspect, a method for transmitting authentication variables from a transmission end to a receiving end is presented, the method comprising: generating a crypto-sync value at the transmission end; generating a first authentication signature from the crypto-sync value and an encryption key at the transmission end; transmitting the crypto-sync value and the first authentication signature to the receiving end; generating a second authentication signature from the crypto-sync value and the encryption key at the receiving end; incrementing the crypto-sync value at the receiving end if the first authentication signature and the second authentication signature match; and requesting an encryption key exchange if the first authentication signature and the second authentication signature do not match.

In another aspect, a method for synchronizing crypto-sync values of an encryption algorithm at a transmission end and a receiving end is presented, the method comprising: transmitting an encrypted message frame to the receiving end; verifying a current crypto-sync value associated with the encrypted message frame at the receiving end; incrementing the current crypto-sync value at the transmission end and the receiving end if the current crypto-sync value is verified; and transmitting a failure message from the receiving end to the transmission end if the current crypto-sync value is not verified.

In another aspect, a system for encrypting transmission traffic is presented, wherein the transmission traffic comprise at least two traffic types, the system comprising: at least two encryption elements, wherein each of the at least two encryption elements is associated with at least one of the at least two traffic types; and at least one sequence number generator for generating a plurality of sequence numbers, wherein the at least one sequence number generator is coupled to the at least two encryption elements.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

The exemplary embodiments described herein below reside in a wireless telephony communication system configured to employ a CDMA over-the-air interface. Nevertheless, it would be understood by those skilled in the art that a method and apparatus for encrypting transmissions may reside in any of various communication systems employing a wide range of technologies known to those of skill in the art.

An Exemplary CDMA System

Figure 1:
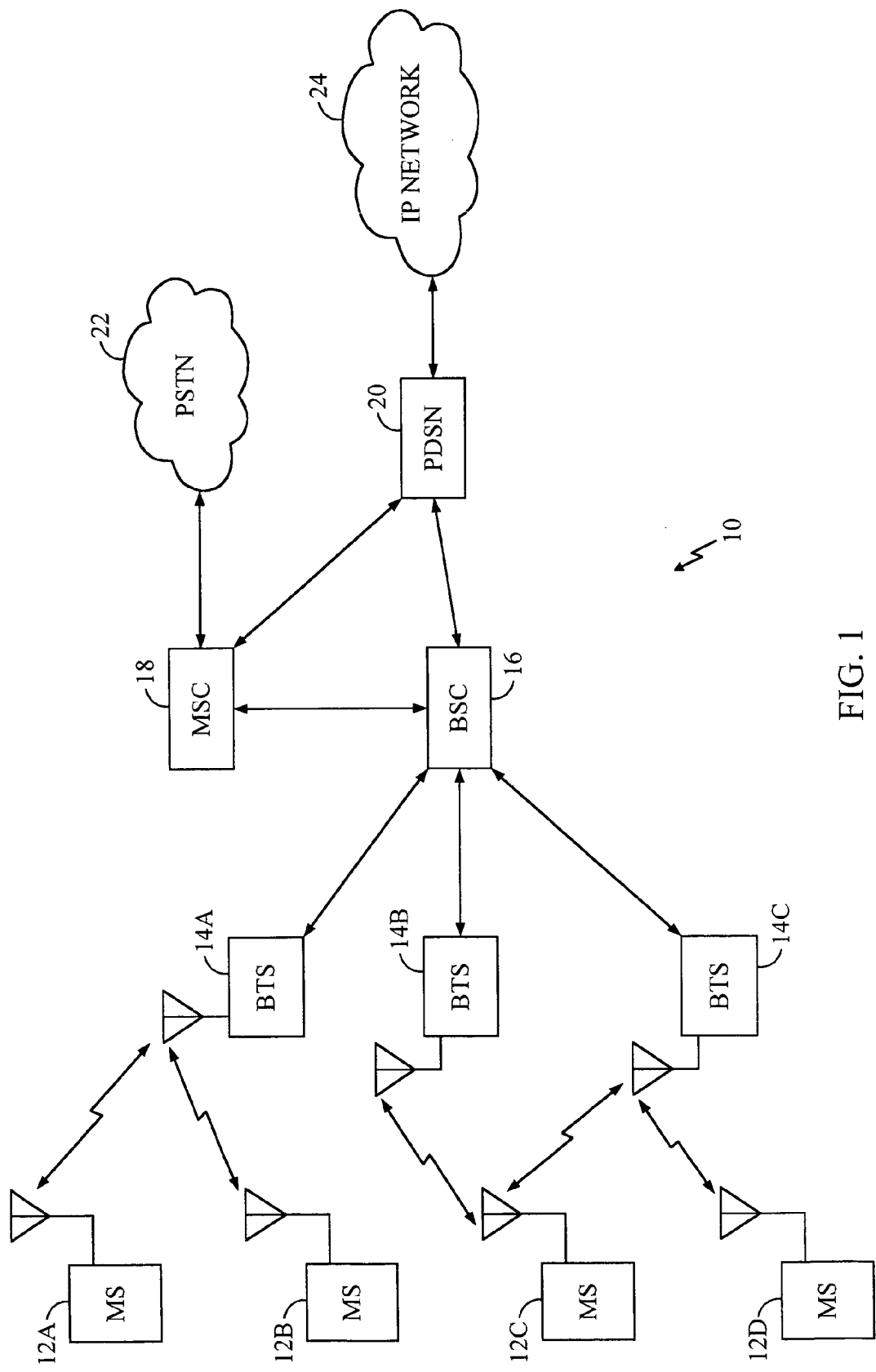
FIG. 1 is a block diagram of an exemplary CDMA system.

As illustrated in FIG. 1, a CDMA wireless telephone system generally includes a plurality of mobile subscriber units 10, a plurality of base stations 12, base station controllers (BSCs) 14, and a mobile switching center (MSC) 16. The MSC 16 is configured to interface with a conventional public switch telephone network (PSTN) 18. The MSC 16 is also configured to interface with the BSCs 14. The BSCs 14 are coupled to the base stations 12 via backhaul lines. The backhaul lines may be configured to support any of several known interfaces including, e.g., E1/T1, ATM, IP, Frame Relay, HDSL, ADSL, or xDSL. It is understood that there may be more than two BSCs 14 in the system. Each base station 12 advantageously includes at least one sector (not shown), each sector comprising an omnidirectional antenna or an antenna pointed in a particular direction radially away from the base station 12. Alternatively, each sector may comprise two antennas for diversity reception. Each base station 12 may advantageously be designed to support a plurality of frequency assignments. The intersection of a sector and a frequency assignment may be referred to as a CDMA channel. The base stations 12 may also be known as base station transceiver subsystems (BTSs) 12. Alternatively, "base station" may be used in the industry to refer collectively to a BSC 14 and one or more BTSs 12. The BTSs 12 may also be denoted "cell sites" 12. Alternatively, individual sectors of a given BTS 12 may be referred to as cell sites. The mobile subscriber stations 10 are typically cellular or PCS telephones 10. The system is advantageously configured for use in accordance with the IS-95 standard.

During typical operation of the cellular telephone system, the base stations 12 receive sets of reverse link signals from sets of mobile stations 10. The mobile stations 10 are conducting telephone calls or other communications. Each reverse link signal received by a given base station 12 is processed within that base station 12. The resulting data is forwarded to the BSCs 14. The BSCs 14 provides call resource allocation and mobility management functionality including the orchestration of soft handoffs between base stations 12. The BSCs 14 also routes the received data to the MSC 16, which provides additional routing services for interface with the PSTN 18. Similarly, the PSTN 18 interfaces with the MSC 16, and the MSC 16 interfaces with the BSCs 14, which in turn control the base stations 12 to transmit sets of forward link signals to sets of mobile stations 10. It should be understood by those of skill that the subscriber stations 10 may be fixed stations in alternate embodiments.

Architecture

Figure 2:
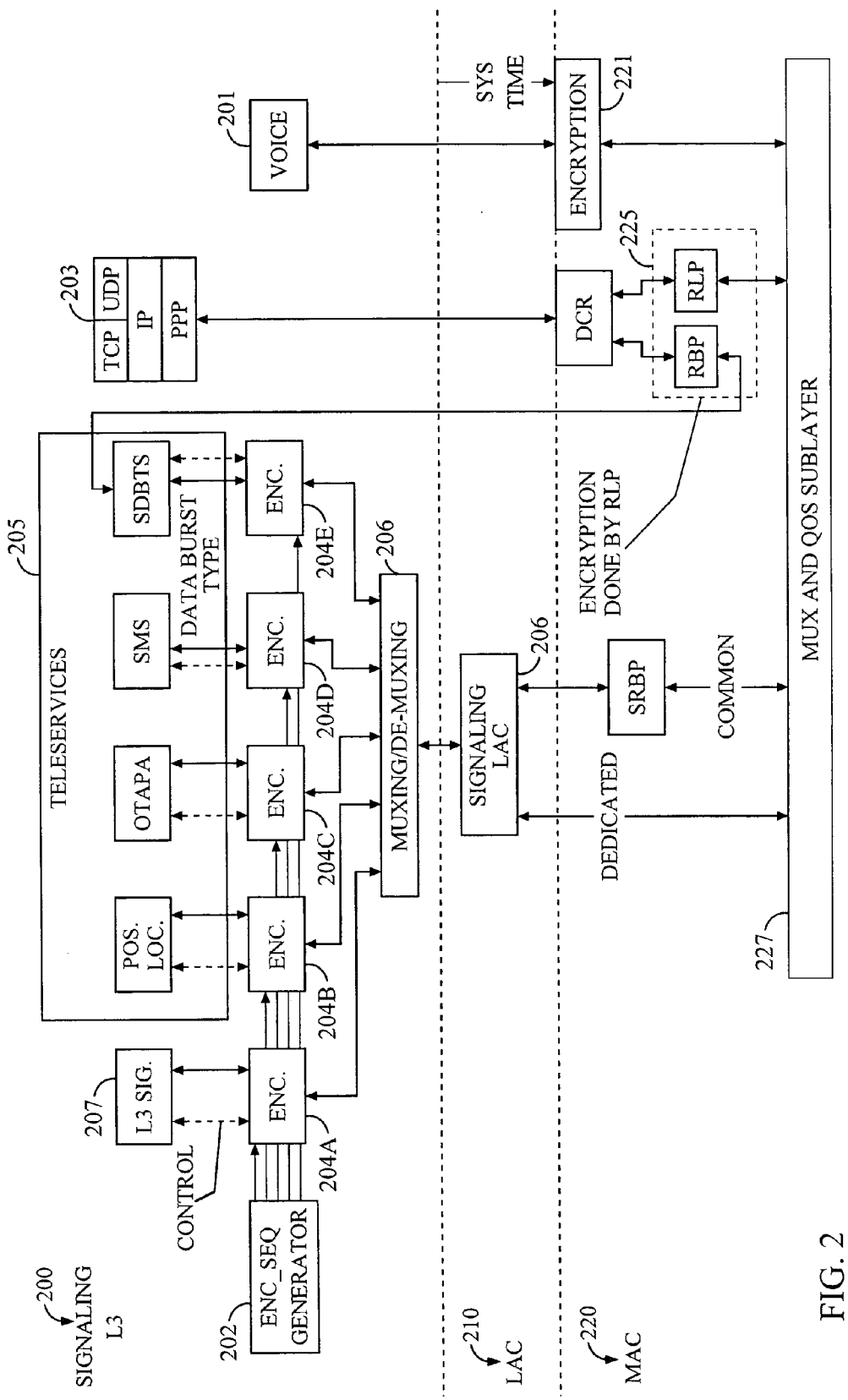
FIG. 2 is a block diagram of the architecture of an encryption scheme.

FIG. 2 illustrates an exemplary architecture for an encryption scheme that can be used to encrypt voice traffic, data traffic, and system services, wherein the architecture can be implemented at both a transmission end and at a receiving end. The structure of the encryption scheme allows each of the three traffic types listed above to be advantageously encrypted for maximum efficiency at separate layers, if so desired. As is known in the art, layering is a method for organizing communication protocols in well-defined encapsulated data units between otherwise de-coupled processing entities, i.e., layers. In the exemplary embodiment illustrated in FIG. 2, three protocol layers L1 220, L2 210, and L3 200 are utilized so that L1 220 provides for the transmission and reception of radio signals between the base station and mobile station, L2 210 provides for the correct transmission and reception of signaling messages, and L3 provides for the control messaging for the communication system.

At layer L3 200, voice traffic 201, packet data traffic 203, and system services 205 are conveyed via data units constructed in accordance with the standards discussed above. However, encryption is performed at this level upon the data units carrying system services 205, but encryption is not performed for packet data traffic 203 or voice traffic 201. In this embodiment, encryption of the packet data traffic 203 and the voice traffic 201 is implemented by lower layers.

ENC_SEQ generator 202 provides a sequence number that is used to construct a crypto-sync value. In one aspect of the embodiment, the four least significant bits of a sequence number are used to construct a crypto-sync value. A crypto-sync value is a variable that is inputted to an encryption algorithm along with an encryption key. The encryption algorithm generates a mask through which unencrypted data is encrypted. Crypto-syncs differ from encryption keys in that an encryption key is a semi-permanent shared secret while a crypto-sync value will vary with respect to the data units transmitted during the link in order to protect against a replay attack. In this embodiment, the crypto-sync value will vary due to a dependence upon either a generated sequence number, a system time, or any other designated identifier. It should be noted that one may alter the number of bits used for the crypto-sync value without changing the scope of the embodiment.

The crypto-sync value is inputted to encryption elements 204 along with data from the L3 Signaling element 207 and a teleservices element 205. Teleservices may comprise system services such as Short Data Burst Transmission Services, Short Messaging Services, Position Location Services, etc. In FIG. 2, a separate encryption element 204 is assigned to process each system service output. An advantage of this structure is that each service can determine the level of encryption needed according to service requirements. However, an alternate embodiment may be implemented wherein an encryption element may be shared by multiple system services. In the present embodiment, the output of the encryption elements 204 are multiplexed together at multiplexer/demultiplexer element 206. In an alternative embodiment, frames of data traffic from the packet data element 203 are also encrypted at level L3 200.

At level L2 210, the output from the multiplexer/de-multiplexer element passes through a Signaling LAC 212. At level L1 220, message frames from the packet data element 203 passes through the Radio Link Protocol (RLP) layer 225, wherein encryption occurs based upon crypto-syncs constructed with RLP sequence numbers. In this embodiment, the RLP layer 225 resides in layer L2 210 and is responsible for retransmitting packet data traffic when a transmission error occurs. Frames of voice traffic from voice element 201 are encrypted separately at encryption element 221 in order to advantageously utilize system time as part of the crypto-sync for each voice frame, rather than sequence numbers from ENC_SEQ generator element 202.

The outputs of encryption element 221, RLP layer 225, and the Signaling LAC 212 are multiplexed together at the MUX and QoS Sublayer 227.

The advantages of this particular architecture are numerous. First, each of the teleservices and L3 signaling elements on level L3 can specify the level of encryption security performed by each of the respective, connected encryption elements.

Second, each of the traffic types can expediently utilize system resources to construct the crypto-sync for each frame of traffic. For example, voice traffic frames do not have extra space for carrying ENC_SEQ. However, system time can be used as a substitute since the system time varies from frame to frame, and the system time is implicitly known at both the transmission end and the receiving end. System time should not be used for encrypting packet data traffic and teleservices. If system time is used to construct the crypto-sync, the data to be encrypted must be encrypted just prior to transmission in order to use the system time at transmission. Hence, encrypted frames could not be buffered. If the RLP sequence number or the ENC_SEQ number is used, then transmission frames can be encrypted and temporarily stored in a buffer until transmission. In addition, it is advantageous to use the ENC_SEQ value rather than a message sequence number MSG_SEQ because resets of the LAC layer cause the encryption of different non-encrypted text with the same encryption mask, which would compromise the security of the encryption process.

Third, placing encryption elements at a level above LAC solves a problem of efficiency. If the encryption/decryption occurred at the physical layer, then ARQ fields would need to be encrypted and decrypted before an ACK could be transmitted. ARQ is an acronym for Automatic Retransmission reQuest, which is a method for checking transmitted data through transmitted acknowledgments and negative acknowledgments. Another difficulty that occurs if the encryption/decryption occurs at the physical layer is that cyclic redundancy check (CRC) bits used for determining transmission errors at a receiver would be computed based on un-encrypted data.

Encryption of Signaling Messages

Figure 3:
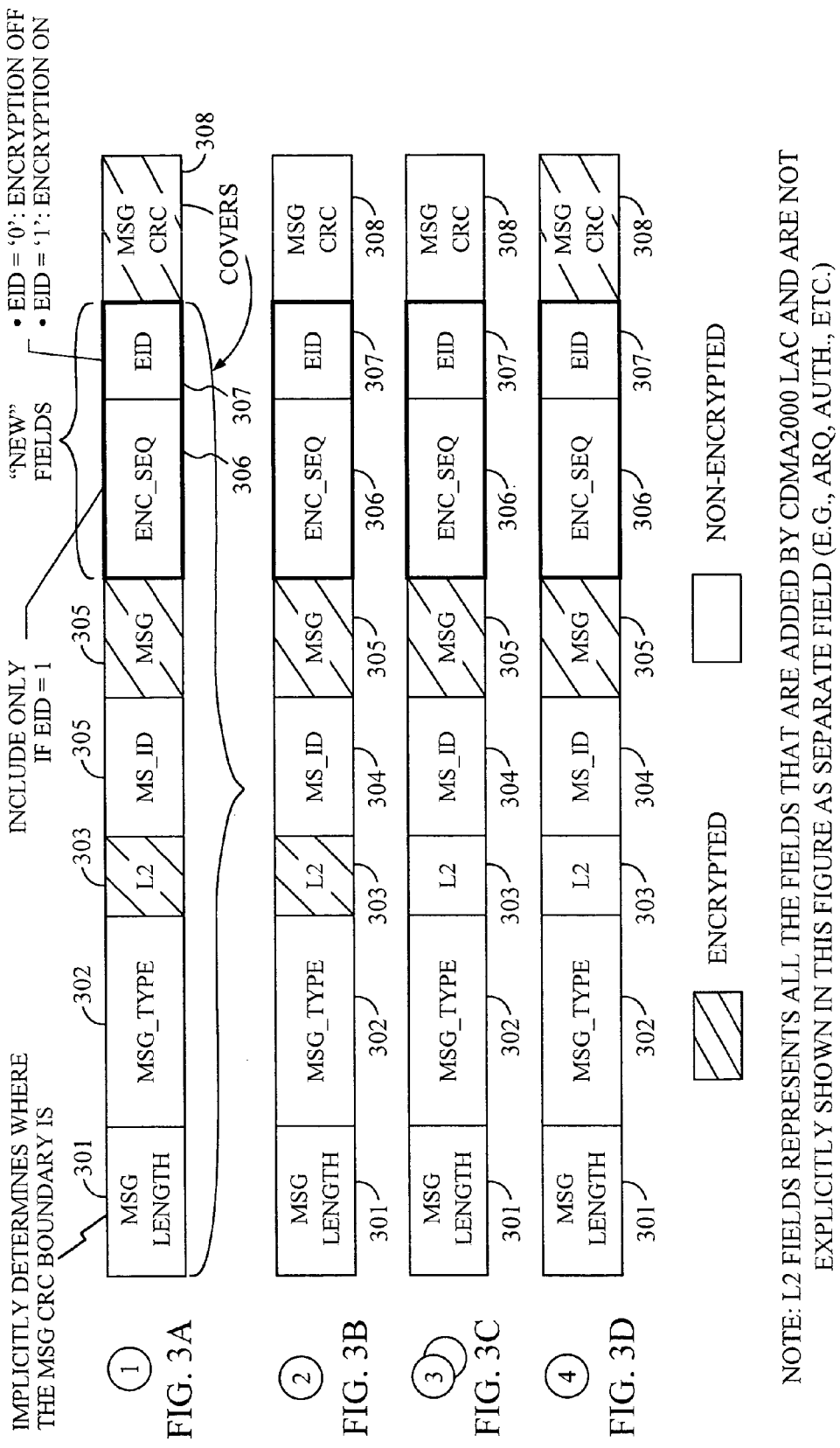
FIGS. 3A, 3B, 3C, and 3D are samples of transmission frame structures.

FIGS. 3A, 3B, 3C, and 3D are alternate structures for constructing transmission frames in the exemplary embodiment. A transmission frame 300 is constructed with the following fields: a message length field 301, a message type field 302, a link access control field 303 that generically represents various ARQ fields, a message identification field 304, a message field 305, an encoding sequence number field 306, an encryption identification field 307, and a message CRC field 308. In one embodiment, encryption is imposed only on specific fields of the transmission frame. In FIG. 3A and FIG. 3B, the LAC field 303 is encrypted. However, encryption of the LAC field 303 is problematic when access probes are transmitted from a mobile station to a base station but the base station determines that the access probes should be stopped with an ACK. In particular, if the mobile station cannot decrypt the LAC field of the message frame from a base station, then the mobile station will not stop sending the access probes until the maximum number of probes is sent.

In FIG. 3A and FIG. 3D, the message CRC field 308 is encrypted. However, encryption of the CRC bits makes validation of the message length field 301 impossible. Hence, FIG. 3C is the preferred transmission frame that is used in the exemplary embodiment.

Generation of Encryption Mask

Figure 4:
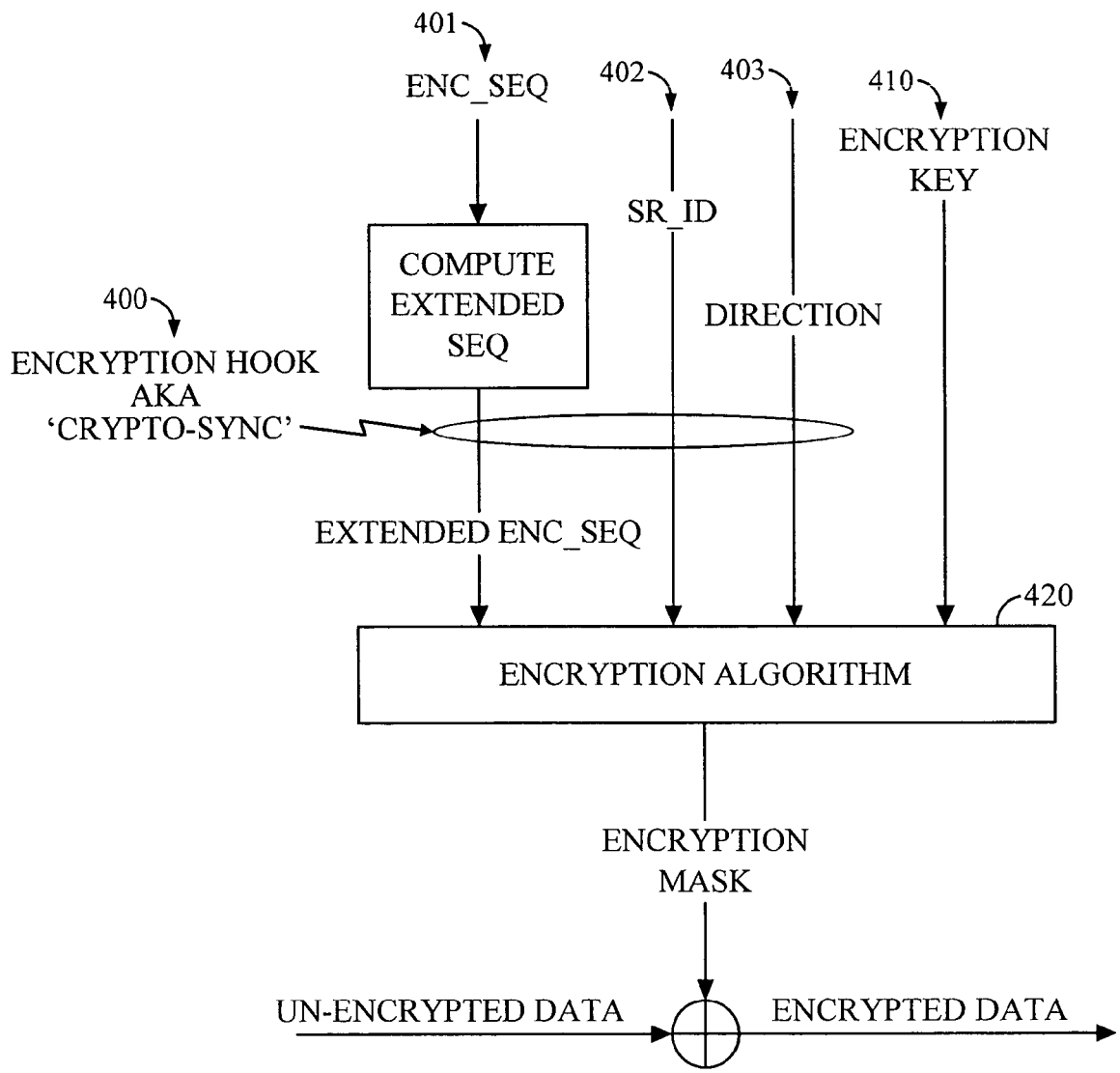
FIG. 4 is a block diagram of the process that converts a non-encrypted data unit into an encrypted data unit.

FIG. 4 illustrates the parameters that are used to encrypt data in an exemplary embodiment, wherein the data unit carries packet data traffic. Crypto-sync 400 comprises an encryption sequence number 401, a service reference identification number 402, otherwise known as sr_id, and a bit value for the direction of transmission 403. An sr_id determines the data service to which the sr_id corresponds. Crypto-sync 400 and encryption key 410 are input into an encryption algorithm 420, such as ECMEA, as mentioned above. It should be noted that other encryption schemes can be used in this embodiment without affecting the scope of this embodiment. The data unit passes through the encryption algorithm 420 to become encrypted into cipher-text.

In general, an individual crypto-sync value is determined for each data unit that is to be encrypted. Hence, each crypto-sync value results in a different cipher-text even for the same clear-text.

Figure 5:
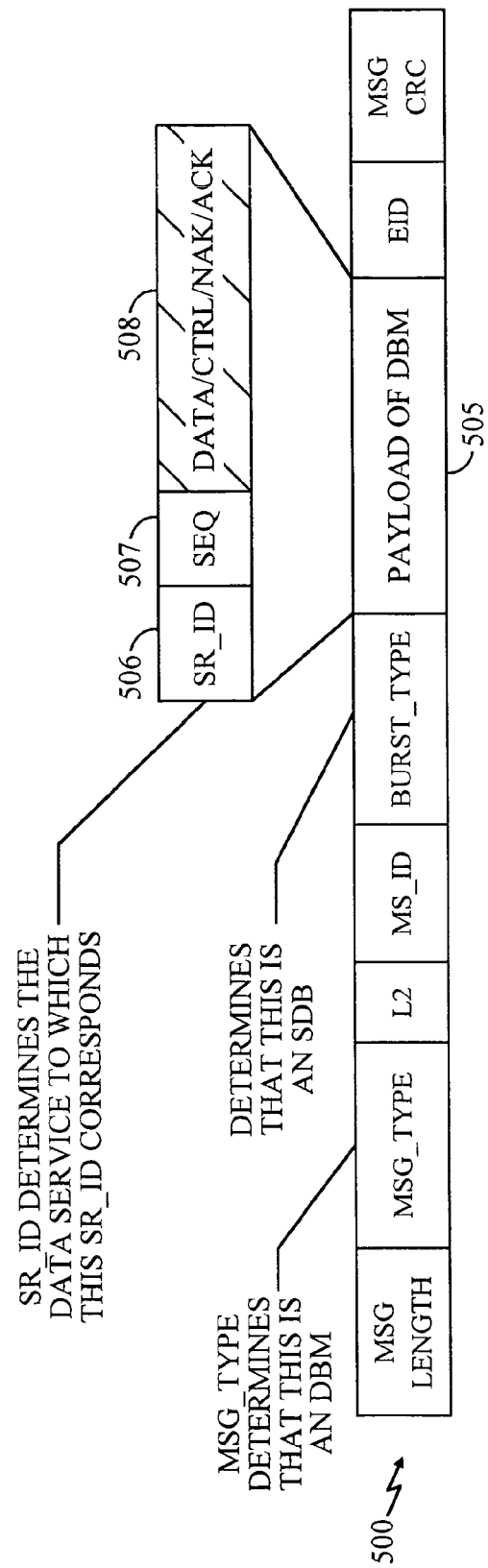
FIG. 5 is a transmission frame structure for packet data traffic.

As illustrated above, the encryption at the RLP layer is accomplished through the use of an extended sequence number, an sr_id, and a direction of the channel. These three variables comprise the crypto-sync for use with packet data traffic. In some instances, packet data traffic may be encapsulated in frames that indicate a short data burst (SDB), wherein the encapsulated frames are transmitted on common channels. FIG. 5 illustrates an example of an encapsulated RLP frame wherein ARQ fields are encrypted. In frame 500, the payload of a data burst message 505 comprises three fields: sr_id field 506, sequence number field 507, and an encrypted RLP frame 508.

Figure 6:
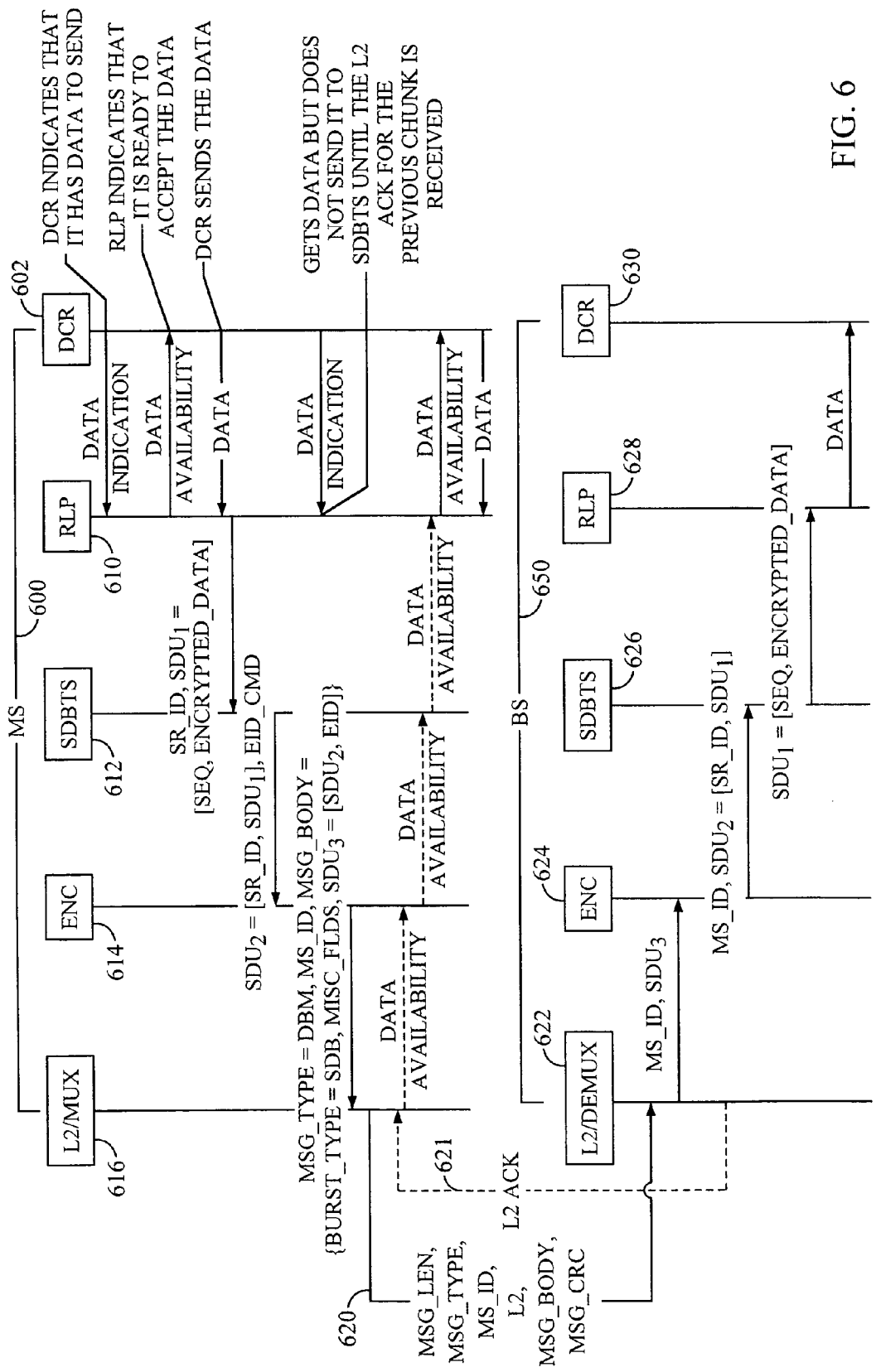
FIG. 6 is a flow chart of the exemplary transmission signals sent from a mobile station to a base station.

FIG. 6 is a flow chart of a sample exchange between elements in the protocol layers. At mobile station 600, a short data burst (SDB) is to be encrypted and transmitted to a base station 650. RLP element 610 receives a data indication and data from DCR 602. RLP 610 transmits a service data unit (SDU) with sequence number, data, and sr_id, to SDBTS element 612, which is part of teleservices in layer L3. SDBTS 612 transmits another SDU, comprising the information from RLP 610 and a EID command, to encryption element 614. Encryption element 614 transmits message frame information and encrypted information from previous elements to L2/Mux element 616. L2/Mux element 616 forms a message frame 620 for transmission over-the-air to base station 650. Base station 650 transmits an acknowledgement 621 to the mobile station 600. At base station 650, information from the message frame is processed in accordance with the corresponding elements that generated the contents of the message frame. Hence, L2/Mux element 622 processes information added by L2/Mux element 616, encryption element 624 processes information added by encryption element 614, SDBTS element 626 processes information added by SDBTS element 612, and RLP element 628 processes information added by RLP element 610, and data is carried to DCR 630.

Crypto-Sync Synchronization

In the description of the embodiments above, the security of the encryption process is accomplished through the use of a secure crypto-sync, wherein the crypto-sync used to encrypt a data unit differs from the crypto-syncs used to encrypt other data units. Hence, the base station and the mobile station must be able to generate the same crypto-sync to code and to decode the same data at the appropriate time. In order to maintain the synchronicity of the crypto-syncs generated by a mobile station and a base station, some over-the-air transmissions must be made. However, over-the-air transmissions are open to attack by rogue mobile stations (RMS). In the proposed security schemes, the base station refuses to accept the value of the crypto-sync proposed by the mobile station until the mobile station proves to be a legitimate subscriber. A refusal to accept the value of the crypto-sync prevents a "replay attack," wherein the RMS forces the base station to apply the same encryption mask to two different plain-texts, which compromises the security of the encryption. For example, suppose E is cipher-text, P is plain-text, and M is the encryption mask. If the crypto-sync is the same for plain-text P and plain-text P', then E=M+P and E'=M+P' using modular 2 addition. Therefore, E+E'=P+P'. Even though the RMS does not know the encryption mask M, plain-text P and plain-text P' can be determined. Hence, in one specific example of an attack, a RMS may transmit repeated registration messages to a base station, which would force a base station to use the same crypto-sync.

In one embodiment, synchronization of the most significant bits of the crypto-sync is maintained between a legitimate mobile station (LMS) and a base station while protecting the encryption strength. In the exemplary embodiment, the LMS transmits authentication variables, which comprise the most significant bits of the crypto-sync, and an authentication signature during the registration process. The most significant bits of crypto-sync will hereinafter be alternatively referred to as CS_h. An example of the registration process of a mobile station entering the range of a base station is described in U.S. Pat. No. 5,289,527, entitled, "Mobile Communication Device Registration Method" and is incorporated by reference herein.

Figure 7:
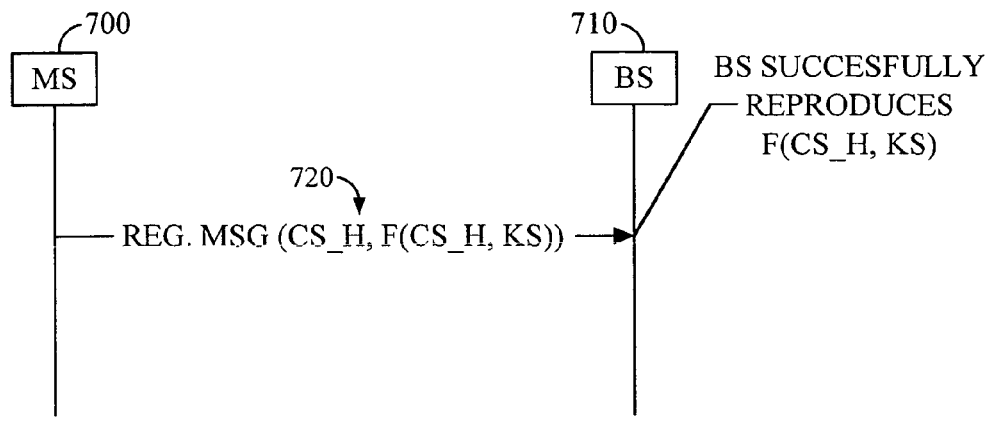
FIG. 7 is a flow chart of a successful crypto-sync exchange between a LMS and a base station.

FIG. 7 illustrates a successful exchange of a crypto-sync between an LMS 700 and a base station 710. LMS 700 transmits a registration message 720 to base station 710, wherein the registration message comprises fields carrying CS_h and an authentication signature. In one embodiment, the authentication signature is computed by using the crypto-sync CS_h and an encryption key (Ks) in a secure hash function. Hereinafter, the crypto-sync signature or authentication signature will be referred to as f(CS_h, Ks).

In the illustration above, the base station 710 is protected from the above-mentioned attack by an RMS because the RMS cannot compute a valid authentication signature for the CS_h.

In an alternative embodiment, the security of the communications between a base station and an LMS is protected from an RMS that has recorded the registration message from a legitimate LMS. In order to prevent the RMS from forcing the base station to use the same CS_h that is intended for use with an LMS, the base station can be set to increment the least significant bits of the crypto-sync each time a registration message from a mobile station is uploaded to the base station. The least significant bits of the crypto-sync will hereinafter be referred to as CS_1. Hence, the crypto-sync value comprise CS_h concatenated with the variable CS_1. In this embodiment, the base station is prevented from repeatedly using the identical crypto-syncs in the encryption process. In those instances wherein the base station does not have a prior value for CS_1 associated with the LMS, the base station can either generate CS_1 randomly or set CS_1 equal to zero.

Figure 8:
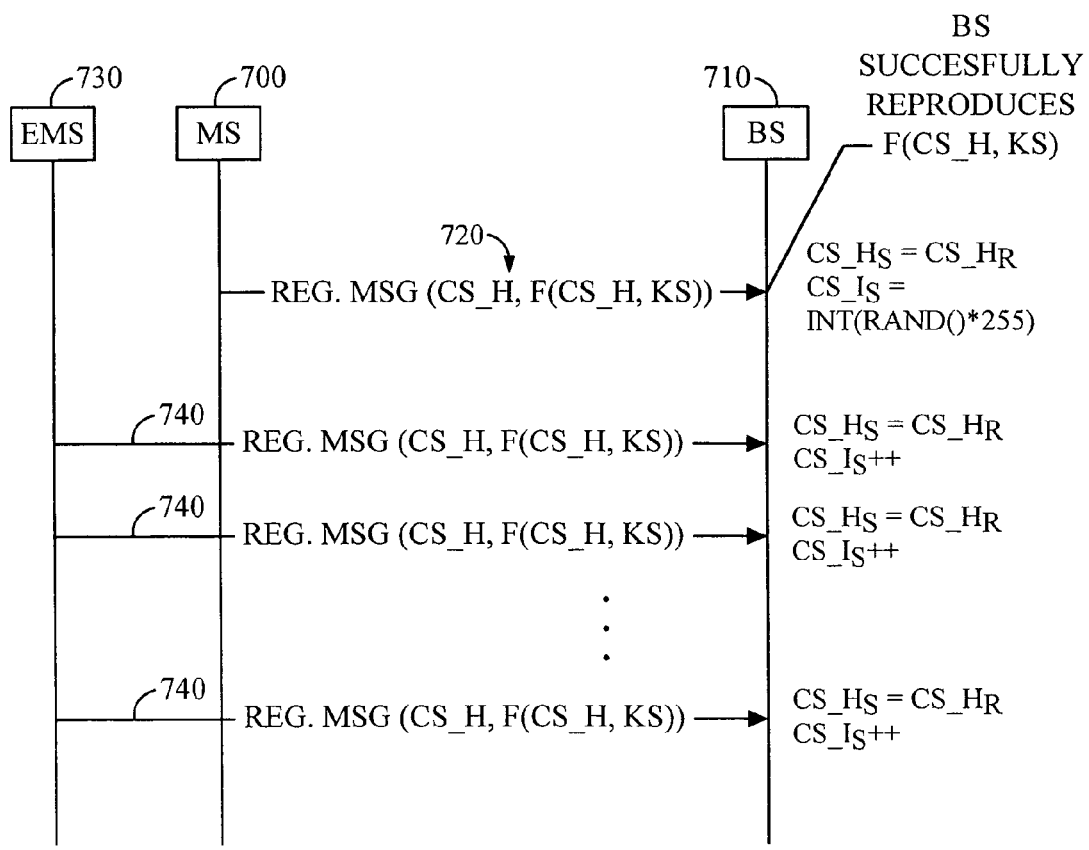
FIG. 8 is a flow chart of an attempted replay attack.

FIG. 8 illustrates an example of a recorded replay attack. LMS 700 transmits a legitimate registration message 720 to base station 710. RMS 730 records the registration message 720 and transmits a copied registration message 740 to base station 710. Base station 710 will not using the same crypto-sync value as for the LMS because the least significant bits of the crypto-sync has been incremented.

If the base station cannot generate the same authentication signature as the one transmitted by a mobile station, then the system determines that the encryption key held by the base station is not the same encryption key as held by the mobile station. A key exchange must then be performed.

Figure 9:
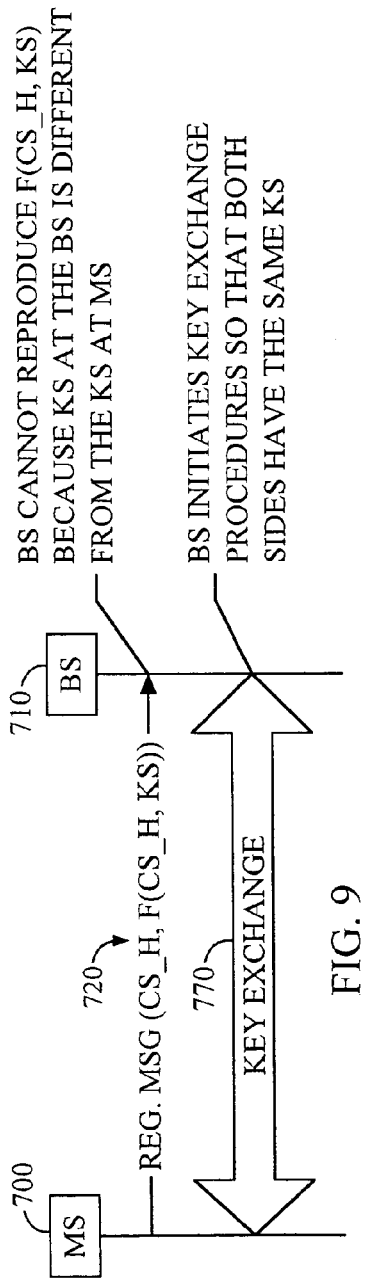
FIG. 9 is a flow chart of an exchange of encryption keys upon registration failure.

FIG. 9 illustrates an exchange of encryption keys upon registration failure. LMS 700 transmits a registration message 720, comprising the crypto-sync variable CS_h and the authentication signature f(CS_h, Ks), to base station 710. Base station 710 cannot reproduce authentication signature f(CS_h, Ks) because the encryption key at the base station 710 differs from the encryption key at the LMS 700. Base station 710 initiates key exchange step 770 in order for base station 710 and LMS 700 to have the same encryption key. The security of key exchanges, is known by those skilled in the art. However, the verification of the crypto-sync is a problem that has not been addressed in the art. As described earlier, a crypto-sync is a variable value that varies for each data unit that is encrypted in the unencrypted data stream. There must be some verification method to ensure that the crypto-sync value with which a data unit is encrypted is the same crypto-sync value that is used at the decryption end. This is not a problem addressed by key exchange methods wherein a single key is exchanged at the start of the registration process. Hence, the methods for secure key exchanges are inadequate for the verification needs of secure crypto-sync exchanges.

In one embodiment, a novel and nonobvious use of Cyclic Redundancy Check (CRC) bits can be implemented to verify that the crypto-sync generated by both a base station and a mobile station for the same data unit are identical. In this embodiment, an encryption CRC, also referred to as CRC_enc, is included in the encrypted data unit. The encryption CRC is computed before the unencrypted data unit is encrypted and is then appended to the unencrypted data unit. When the unencrypted data unit is encrypted with the associated crypto-sync CS_h and the encryption key Ks, the encryption CRC is also encrypted by the same crypto-sync CS_h and encryption key Ks. After the encrypted text is generated, a transmission error detection CRC, called MSG CRC, is appended to the encrypted data unit along with the assorted fields necessary for transmission. If the MSG CRC passes a check at the receiving end, then the CRC_enc is also checked at the receiving end. If the CRC_enc fails to pass, a determination is made that a CS_h mismatch has occurred. It should be noted that the validity of the encryption key Ks was already verified during the registration process when a correct authentication signature f(CS_h, Ks) was computed.

Figure 10:
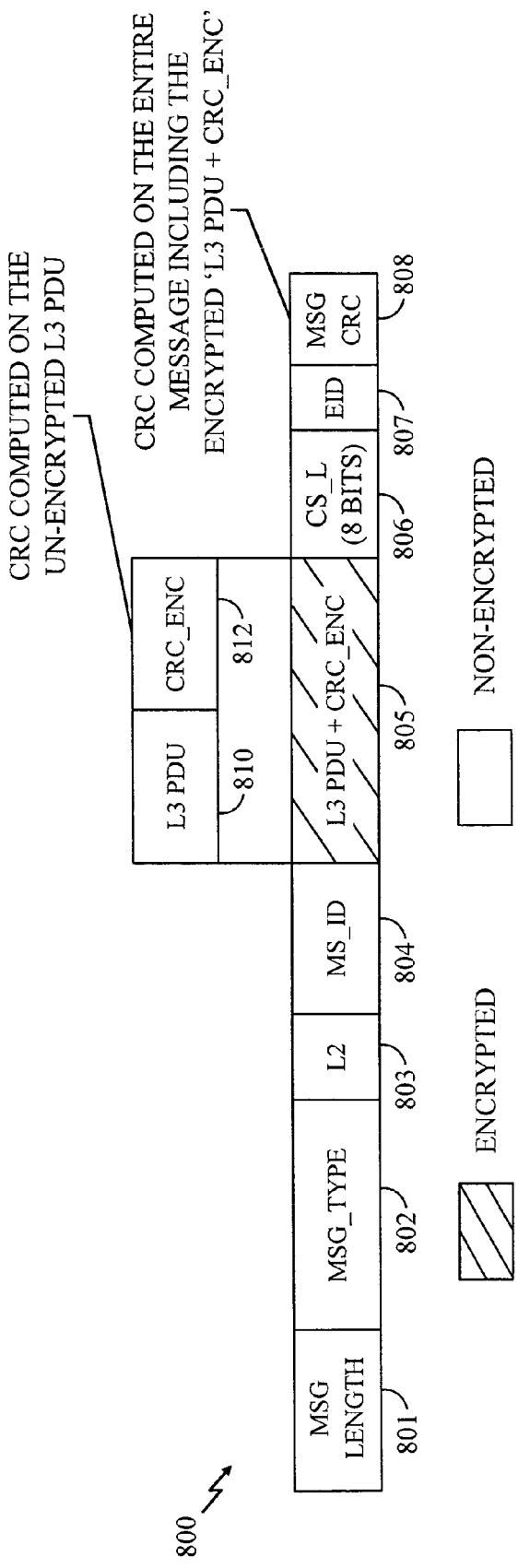
FIG. 10 is a transmission frame for an exemplary communication system.

FIG. 10 illustrates a frame structure for a message transmission in a system such as cdma2000. Frame 800 is composed of various fields necessary for the transport of data traffic from one station to another. CRC_enc 812 is a CRC computed on the unencrypted protocol data unit L3 PDU 810. CRC_enc 812 and L3_PDU 810 are then encrypted to form encrypted field 805. A field CS_L 806 is included to indicate a sequence number upon which a crypto-sync is computed. The EID bit 807 is set to either zero or one to indicate the presence of an encrypted message. The MSG_CRC field 808 is then computed on the entire message frame 800.

Figure 11:
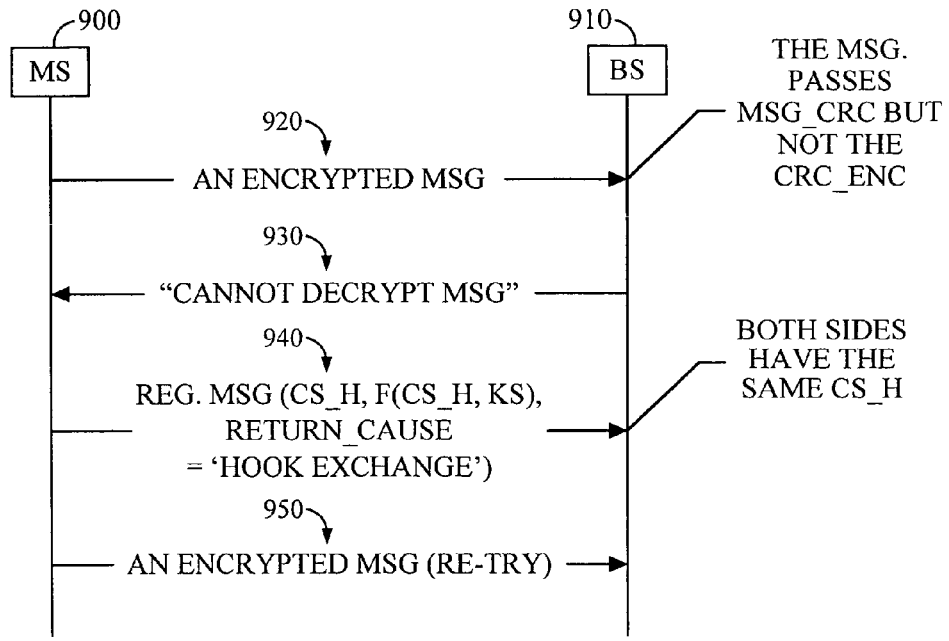
FIG. 11 is a flow chart of transmission signals, wherein a base station detects a decryption failure.
Figure 12:
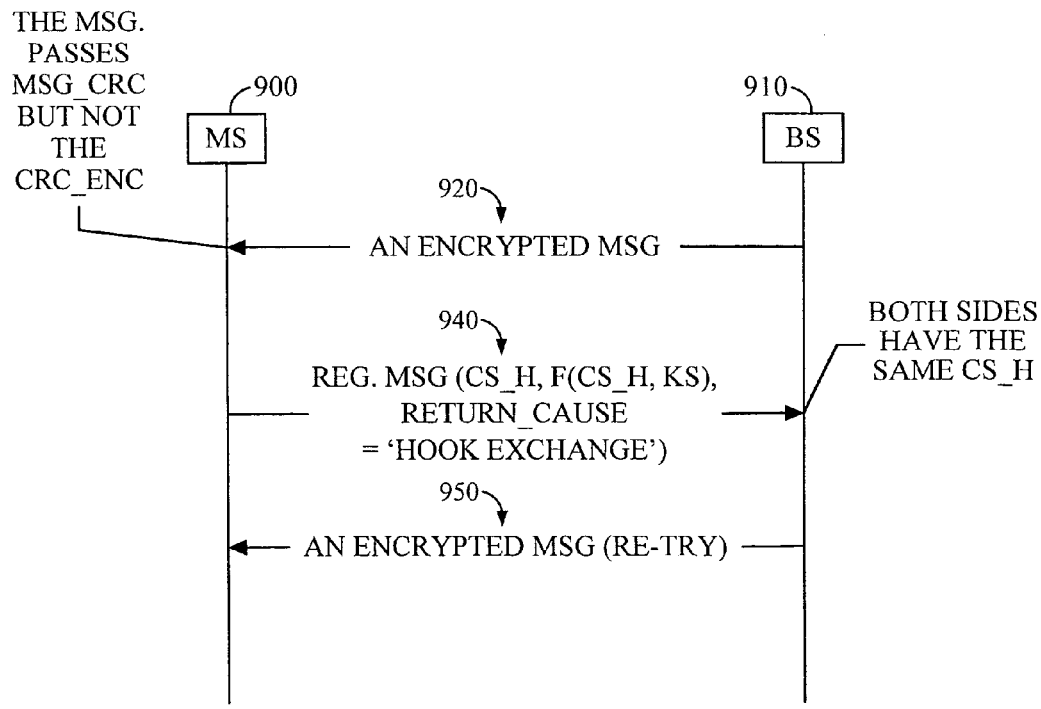
FIG. 12 is a flow chart of transmission signals, wherein a mobile station detects a decryption failure.

If a determination is made, based on the CRC_enc computed at the receiving end, that the crypto-sync CS_h is out of synchronization with the crypto-sync at the transmission end, then a recovery procedure must be implemented. FIG. 11 and FIG. 12 are two message flow charts that illustrate an error recovery procedure. In FIG. 11, a base station detects a failure in decryption. In FIG. 12, a mobile station detects a failure in decryption.

In FIG. 11, an LMS 900 transmits an encrypted message 920 to a base station 910. The CRC bits of the encrypted message 920 pass, indicating that there are no transmission errors, or a recoverable amount of transmission errors. However, base station 910 cannot decode the encoder CRC, CRC_enc. The base station 910 transmits a "Cannot Decrypt" message 930 to the LMS 900. The LMS 900 then transmits a registration message 940 comprising the crypto-sync CS_h, the authentication signature f(CS_h, Ks), and a hook exchange parameter. At this point, both the LMS 900 and the base station 910 have the same crypto-sync CS_h. The LMS 900 then retransmits the encrypted message 950.

In FIG. 12, a base station 910 transmits an encrypted message 920 to an LMS 900. The CRC bits of the encrypted message 920 pass, indicating that there are no transmission errors, or a recoverable amount of transmission errors. However, LMS 900 cannot decode the encoder CRC, CRC_enc. The LMS 900 then transmits a registration message 940 comprising the crypto-sync CS_h, the authentication signature f(CS_h, Ks), and a hook exchange parameter. At this point, both the LMS 900 and the base station 910 have the same crypto-sync CS_h. The base station 910 then retransmits the encrypted message 950.

Hence, in both methods illustrated in FIG. 11 and FIG. 12, a message frame that fails to pass the decryption step at the receiving end is to be re-transmitted as though the message frame was transmitted with unrecoverable errors.

It should be noted from the examples above that the CS_h field initializes the most significant bits of the crypto-sync for both forward and reverse links. Although both forward and reverse links use the same CS_h, differing encryption results are derived because the direction of the transmission is a variable that is inputted to the encryption key generation algorithm, i.e., '0' may indicate a forward link message while '1' indicates a reverse link message. In one embodiment, the crypto-sync values may increment independently after initialization.

The choice of a crypto-sync value made by a mobile station can also be important. In order to maintain the security of the encryption, a crypto-sync should not be repeated during over-the-air transmissions. In one embodiment, the mobile station sets the crypto-sync value equal to one (1) added to the maximum value between the most significant bits of the current forward link crypto-sync value $CS\_h_{fwd}$, and the most significant bits of the current reverse link crypto-sync value $CS\_h_{rev}$. Hence, $CS\_h = 1 + \max(CS\_h_{fwd}, CS\_h_{rev})$.

Thus, a novel and improved method and apparatus for encrypting transmissions have been described. Those of skill in the art would understand that the data, instructions, commands, information, signals, bits, symbols, and chips that may be referenced throughout the above description are advantageously represented by voltages, currents, electromagnetic waves, magnetic fields or particles, optical fields or particles, or any combination thereof. Those of skill would further appreciate that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof designed to perform the functions described herein. The processor may advantageously be a microprocessor, but in the alternative, the processor may be any conventional processor, controller, microcontroller, or state machine. The software module could reside in RAM memory, flash memory, ROM memory, EPROM memory, EEPROM memory, registers, hard disk, a removable disk, a CD-ROM, or any other form of storage medium known in the art. An exemplary processor is advantageously coupled to a storage medium so as to read information from, and write information to, the storage medium. In the alternative, the storage medium may be integral to the processor. The processor and the storage medium may reside in an ASIC. The ASIC may reside in a telephone. In the alternative, the processor and the storage medium may reside in a telephone. The processor may be implemented as a combination of a DSP and a microprocessor, or as two microprocessors in conjunction with a DSP core, etc.

Preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

What is claimed is:

1. A method for encrypting transmission traffic at separate protocol layers, comprising:
   providing a plurality of encryption elements, each encryption element provided by inputting a variable value and an encryption key into an encryption algorithm to obtain an encryption mask that varies from data unit to data unit as the variable value changes;
   assigning different types of transmission traffic to the encryption elements to provide different levels of encryption based on service requirements of the different types of transmission traffic; and encrypting the different types of transmission traffic using the corresponding encryption mask for the assigned encryption elements.

2. The method of claim 1, wherein the variable value is constructed from four least significant bits of a sequence number.

3. The method of claim 1, wherein the variable value for each encryption element is different from other encryption elements.

4. The method of claim 1, wherein the variable value varies due to a dependence on a generated sequence number.

5. The method of claim 1, wherein the variable value varies due to a dependence on a system time.

6. An apparatus for encrypting transmission traffic at separate protocol layers, comprising:

means for providing a plurality of encryption elements, each encryption element provided by inputting a variable value and an encryption key into an encryption algorithm to obtain an encryption mask that varies from data unit to data unit as the variable value changes;

means for assigning different types of transmission traffic to the encryption elements to provide different levels of encryption based on service requirements of the different types of transmission traffic; and means for encrypting the different types of transmission traffic using the corresponding encryption mask for the assigned encryption elements.

7. The apparatus of claim 6, wherein the variable value for each encryption element is different from other encryption elements.

8. The apparatus of claim 6, wherein the variable value is constructed from four least significant bits of a sequence number.

9. An apparatus for encrypting transmission traffic at separate protocol layers, comprising:

a processor;

a storage element coupled to the processor comprising an instruction set executable by the processor, wherein the instruction set comprises instructions for:

providing a plurality of encryption elements, each encryption element provided by inputting a variable value and an encryption key into an encryption algorithm to obtain an encryption mask that varies from data unit to data unit as the variable value changes;

assigning different types of transmission traffic to the encryption elements to provide different levels of encryption based on service requirements of the different types of transmission traffic; and encrypting the different types of transmission traffic using the corresponding encryption mask for the assigned encryption elements.

10. The apparatus of claim 9, wherein the variable value is constructed from four least significant bits of a sequence number.

11. The apparatus of claim 9, wherein the variable value for each encryption element is different from other encryption elements.

12. The apparatus of claim 9, wherein the variable value varies due to a dependence on a generated sequence number.

13. The apparatus of claim 9, wherein the variable value varies due to a dependence on a system time.

14. A non-transitory storage medium comprising an instruction set executable by a processor, wherein the instruction set comprises instructions for:

providing a plurality of encryption elements, each encryption element provided by inputting a variable value and an encryption key into an encryption algorithm to obtain an encryption mask that varies from data unit to data unit as the variable value changes;

assigning different types of transmission traffic to the encryption elements to provide different levels of encryption based on service requirements of the different types of transmission traffic; and encrypting the different types of transmission traffic using the corresponding encryption mask for the assigned encryption elements.

15. The non-transitory storage medium of claim 14, wherein the variable value is constructed from four least significant bits of a sequence number.

16. The non-transitory storage medium of claim 14, wherein the variable value for each encryption element is different from other encryption elements.

17. The non-transitory storage medium of claim 14, wherein the variable value varies due to a dependence on a generated sequence number.

18. The non-transitory storage medium of claim 14, wherein the variable value varies due to a dependence on a system time.

19. The method of claim 1, wherein the plurality of encryption elements include at least two encryption elements, wherein each of the at least two encryption elements encrypts the transmission traffic in different communication protocol layers.

20. The method of claim 1, wherein a data unit is defined by a transmission frame that includes a message field, a link access control field, and a message cyclic redundancy check field, where the message field and at least one of the link access control field and the message cyclic redundancy check field are encrypted using the encryption mask of an assigned encryption element.

21. The method of claim 20, wherein the transmission frame further includes an encryption sequence number used to generate the encryption mask for the corresponding encryption element used to encrypt the corresponding data unit.

22. The method of claim 20, wherein the transmission frame further includes an encryption identification field used to indicate whether portions of the transmission frame have been encrypted.

* * * * *